United States Patent
Jin

(10) Patent No.: US 8,396,085 B2
(45) Date of Patent: Mar. 12, 2013

(54) FEEDFORWARD SYNCHRONIZATION IN ASYNCHRONOUS PACKET NETWORKS

(75) Inventor: Qu Gary Jin, Kanata (CA)

(73) Assignee: Microsemi Semiconductor ULC, Kanata, ON (CA)

( * ) Notice: Subject to any disclaimer, the term of this patent is extended or adjusted under 35 U.S.C. 154(b) by 147 days.

(21) Appl. No.: 13/015,361

(22) Filed: Jan. 27, 2011

(65) Prior Publication Data

US 2011/0200060 A1    Aug. 18, 2011

(30) Foreign Application Priority Data

Feb. 12, 2010   (GB) .................................. 1002401.6

(51) Int. Cl.
*H04J 3/06*    (2006.01)
(52) U.S. Cl. .................... 370/503; 370/350; 331/44
(58) Field of Classification Search .................. None
See application file for complete search history.

(56) References Cited

U.S. PATENT DOCUMENTS

| | | | | |
|---|---|---|---|---|
| 5,661,485 | A * | 8/1997 | Manuel ........................ | 342/13 |
| 7,590,210 | B2 * | 9/2009 | Aweya et al. ................. | 375/356 |
| 2002/0070811 | A1 * | 6/2002 | Skierszkan .................. | 331/1 A |
| 2002/0186716 | A1 * | 12/2002 | Eidson ........................ | 370/503 |
| 2005/0041692 | A1 * | 2/2005 | Kallstenius .................. | 370/503 |
| 2007/0097947 | A1 * | 5/2007 | Aweya et al. ................. | 370/350 |
| 2008/0031283 | A1 * | 2/2008 | Curran-Gray et al. ........ | 370/503 |
| 2008/0075152 | A1 | 3/2008 | Melanson | |
| 2008/0095269 | A1 * | 4/2008 | Frantzeskakis et al. ...... | 375/302 |
| 2009/0047913 | A1 * | 2/2009 | Kuru ............................ | 455/76 |

* cited by examiner

*Primary Examiner* — Andrew Chriss
*Assistant Examiner* — Romani Ohri
(74) *Attorney, Agent, or Firm* — Marks & Clerk

(57) ABSTRACT

To perform timing synchronization in an asynchronous packet network, remote timestamps representative of a transmitter clock at a transmitter are received over a packet network. These are compared with local timestamps representative of the timing of a local oscillator at the receiver to produce an estimate of the offset between the transmitter clock and the local oscillator at the receiver. This estimate is then used to generate update values for a digital controlled oscillator producing the output clock at the receiver. The system operates in a feedforward configuration wherein the local oscillator at the receiver serves as one input to the offset estimator.

18 Claims, 3 Drawing Sheets

FEEDFORWARD SYNCHRONIZATION IN ASYNCHRONOUS PACKET NETWORKS

FIELD OF THE INVENTION

This invention relates to the field of packet networks, and in particular to timing synchronization over asynchronous packet networks.

BACKGROUND OF THE INVENTION

Timing-over-Packet (ToP) technology enables accurate timing and synchronization to be distributed across asynchronous packet infrastructures, allowing carriers to confidently support time-critical services, such as video and voice, over packet networks A common network timing transmission with ToP technology is shown in FIG. 1, where the transmitter side transmits the time stamp $n_{tx}$, which is the phase of master digital controlled oscillator (DCO clock) at the transmitter side. At receiver side, the processor compares the transmitter time stamp (after it has passed through the network) with a locally generated time stamp from the receiver DCO. The difference in time stamp, which is called transit time, is used to adjust receiver DCO so that it will be synchronized with the master DCO. The whole architecture constitutes feedback loop.

A prior art system is shown in FIG. 1. In this system the output of the receiver DCO is compared with the timestamp received from the transmitter and the result used to change the output frequency of the DCO in a feedback loop. This feedback architecture gives rise to loop stability issues.

SUMMARY OF THE INVENTION

According to the present invention there is provided a method of performing timing synchronization in an asynchronous packet network, comprising: receiving over a packet network remote timestamps representative of a transmitter clock at a transmitter; generating local timestamps at a receiver representative of the timing of a local oscillator at the receiver; generating an output clock at the receiver with a digital controlled oscillator; deriving an adjustment signal from the local and remote timestamps; and adjusting the digital controlled oscillator in a feedforward configuration in accordance with the derived adjustment signal.

The novel timing-over-packet solution allows accurate local timing estimating without a feedback loop. In one embodiment, the Least Square algorithm is used to estimate the frequency and phase error of local system clock. This provides a good method for a general unknown network delay distribution because it is very robust and accurate. The DCO is adjusted so that it can be synchronized with the remote reference clock. Embodiments of the invention allow multiple DCO adjustment with single frequency and phase estimation on the common system clock source.

The novel ToP method allows the local clock to track the reference clock through an unknown network with minimum error. The feedforward architecture allows the local clock synchronization without a feedback loop. This arrangement makes the system extremely stable and separates the two procedures of clock estimation and clock adjustment. It is also an inexpensive implementation if multiple clock outputs are required.

According to another aspect of the invention there is provided a timing synchronization apparatus for use at a receiver in an asynchronous packet network comprising: a local oscillator for generating a system clock at the receiver; a timestamp unit for generating local timestamps representative of the local oscillator timing; a processor for receiving remote timestamps sent from a transmitter over a packet network representative of the transmitter clock and the local timestamps to generate an adjustment signal based on an estimate of the offset between the local oscillator and the transmitting clock; a digital controlled oscillator for generating an output clock at the receiver; and an adjustment unit for adjusting the digital controlled oscillator based on the estimate of the offset in a feedforward configuration.

BRIEF DESCRIPTION OF THE DRAWINGS

The invention will now be described in more detail, by way of example only, with reference to the accompanying drawings, in which;—

DETAILED DESCRIPTION OF EMBODIMENTS OF THE INVENTION

Figure 2:
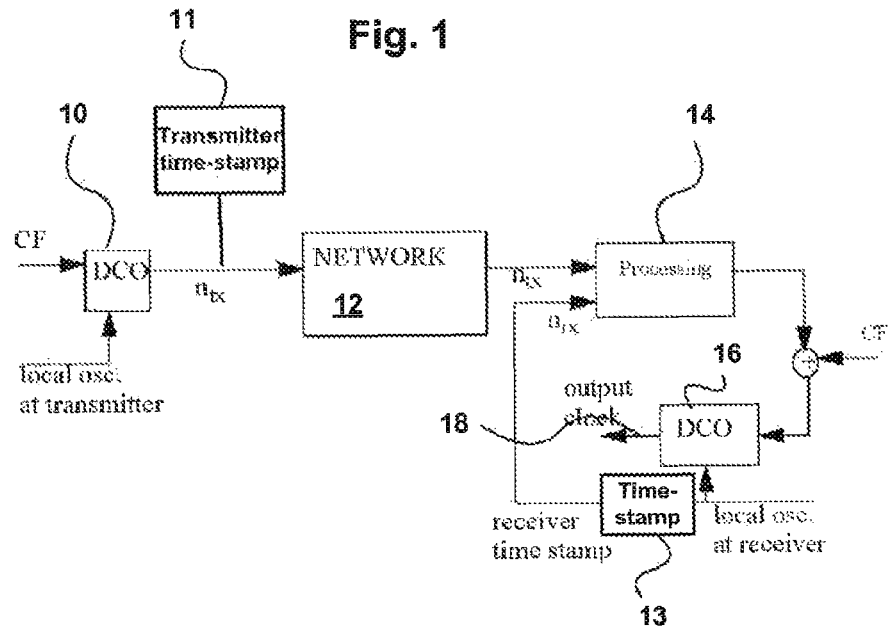
FIG. 2 is a block diagram of a ToP system in accordance with one embodiment of the invention.

FIG. 2 is a block diagram of a ToP system in accordance with one embodiment of the invention, showing the novel feed forward architecture, where the frequency and phase offsets between the asynchronized source (system clock) and reference is estimated without feedback control.

Figure 1:
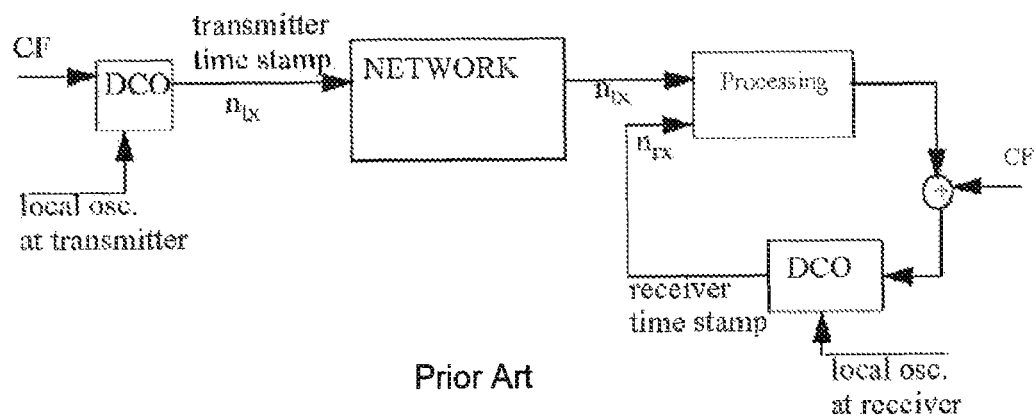
FIG. 1 is a block diagram of a prior art ToP system.

In FIG. 1, the DCO 10 at the transmitter side sends time stamped packets $n_{tx}$ created by timestamp unit 11 through the network 12 to processor 14 at the receiver side, which includes receiver DCO 16.

The DCO 16 is continuously adjusted with the offset estimate. Here the asynchronized source is the system clock provided by the local oscillator at the receiver, which provides the clock source for the DCO 16. The receiver includes timestamp unit 13, which generates receiver timestamps $n_{rx}$. The adjusted output clock is the output of the DCO 16. The frequency and phase offsets between the system clock and reference clock $n_{rx}$ are compensated by digital adjustment of the DCO phase and frequency offset relative to the DCO center frequency CF. The final output clock 18, the DCO 16 output, is not in the feedback loop. Instead, the local oscillator is used as the reference source. This scheme is much more stable, easily designed and debugged because no direct feedback is involved. It also allows simultaneous adjustment of multiple DCOs if they are operated under the same system clock.

Figure 3:
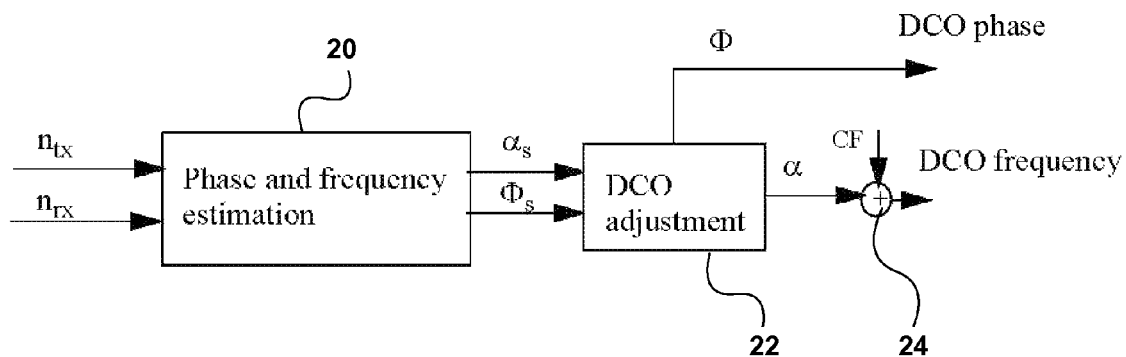
FIG. 3 is a block diagram showing the feedforward architecture.

The feedforward architecture is shown in more detail in FIG. 3 and comprises phase and frequency estimator 20, DCO adjustment block 22 and adder 24. The general expression of time stamp can be expressed as $$n_{tx} = k \cdot T \cdot f_{tx}$$

$$n_{rx} = (k \cdot T + \Delta_k) \cdot f_{rx} + \Phi_s$$

where $n_{tx}$ and $n_{rx}$ are time stamps of packet at transmitter and receiver side respectively, with $f_{tx}$ and $f_{rx}$, as the respective transmitter frequency and local system clock frequency. T is time interval between two consecutive timing packets and k is the index. $\Delta_k$ is the network delay and $\Phi_s$ is the initial phase offset between the transmitter clock and receiver system clock.

The transit time takes the difference between $n_{tx}$ and $n_{rx}$:

$$n_{tx} - n_{rx} = k \cdot T \cdot (f_{tx} - f_{rx}) + \Delta_k \cdot f_{rx} + \Phi_s$$

Let $y_k = n_{tx} - n_{rx}$ be the transit time, $\alpha_s = 1 - f_{rx}/f_{tx}$ be the frequency deviation which we are interested in ($10^6 \cdot \alpha_s$ is the ppm variation of the local clock), the ppm variation of local clock), $x_k = k \cdot T \cdot f_{tx}$ be the transmitter time stamp and $v_k = \Delta_k \cdot f_{rx}$ be the noise, which represents the network delay. Now the estimation is reduced to $$y_k = \alpha_s \cdot x_k + \Phi_s + v_k$$

The key for the DCO adjustment is to estimate $\Phi_s$ and $\alpha_s$ (the frequency error is $\alpha_s \cdot f_{tx}$). The optimum estimation for $\alpha_s$ and $\Phi_s$ is Least Square (LS) estimation, which is $$[\alpha_s, \Phi_s] = \arg\left\{\min_{[\alpha_s,\Phi_s]} \left[\sum_k (y_k - \alpha_s \cdot x_k - \Phi_s)^2\right]\right\}$$

With the number of data collected being N, the solution is $$\hat{\alpha}_s = \frac{\sum x_k y_k - \frac{1}{N}\sum x_k \sum y_k}{\sum x_k^2 - \frac{1}{N}(\sum x_k)^2}$$

$$\hat{\Phi}_s = \frac{\frac{1}{N}\sum x_k^2 \sum y_k - \frac{1}{N}\sum x_k \sum x_k y_k}{\sum x_k^2 - \frac{1}{N}(\sum x_k)^2}$$

Figure 4:
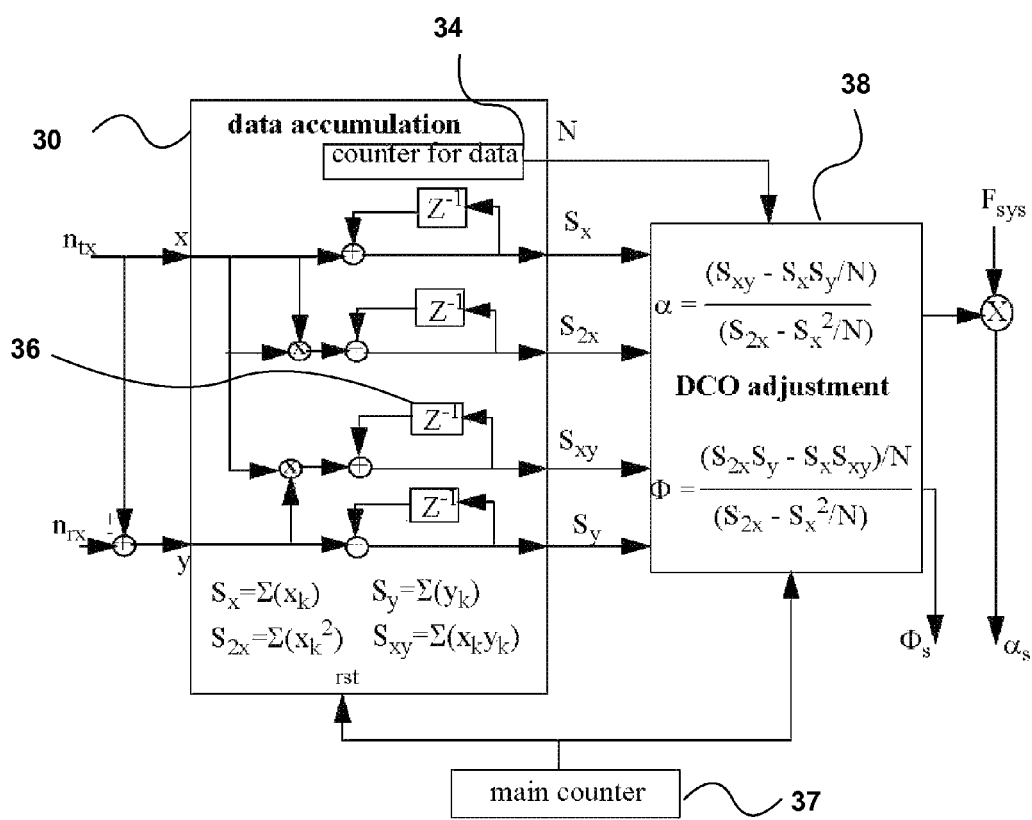
FIG. 4 is a block diagram showing a least squares solution for Top Synchronization.

FIG. 4 shows the implementation of the processor 14 using the least squares solution.

The signals $n_{tx}$ and $n_{rx}$ are input to data accumulation block 30, which comprises counter 34, adders 32 and delay units 36.

The data accumulation block 34 collects each transmitter timestamp and receiver timestamp, and updates $S_x$, $S_y$, $S_{xy}$, and $S_{2x}$, where $$S_x = \Sigma(x_k)$$

$$S_y = \Sigma(y_k)$$

$$S_{2x} = \Sigma(x_k^2)$$

$$S_{xy} = \Sigma(x_k y_k)$$

The number of data collected is stored in the main counter 37. When the main counter 37 reaches a pre-set time limited (T), the clock offset values are calculated in the DCO adjustment block 38 with the number of collected data in that time interval (N). In the meantime, the main counter 34 is reset to zero and all memories and the data counter in the data accumulation block 30 are reset to zero.

The DCO is an accumulator which operates on the system clock generated by the local oscillator at the receiver. With each system clock pulse, the DCO accumulates with input digital value center frequency CF (plus a small offset α). A DCO clock pulse is generated whenever the accumulator overflows with a carry output. The relationship between the system clock and the DCO output frequency is $$F_{DCO} = \frac{CF + \alpha}{2^M} \cdot F_{sys}$$

where $F_{sys} = f_{rx}$ is the frequency of system clock, $F_{DCO}$ is the DCO output frequency, CF is the DCO center frequency value with M bits in its accumulation.

Figure 5:
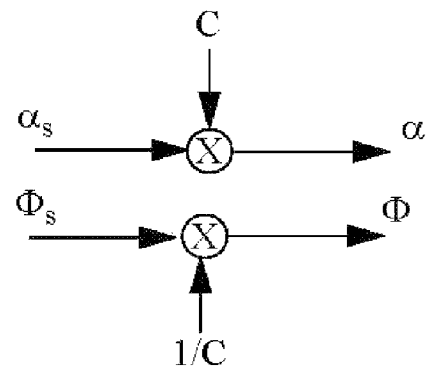
FIG. 5 shows the DCO adjustment system.

FIG. 5 shows in more detail the DCO adjustment block which transfers the system clock phase and frequency offset estimation into DCO frequency and phase adjustment. The scaling factor C is give as follows $$C = \frac{F_{DCO}}{F_{sys}} = \frac{CF}{2^M}$$

In the feedforward architecture, the system clock will not be changed and the DCO is updated to be synchronized with the transmitter clock. There is no clock adjustment feedback to the local time stamp.

Figure 6:
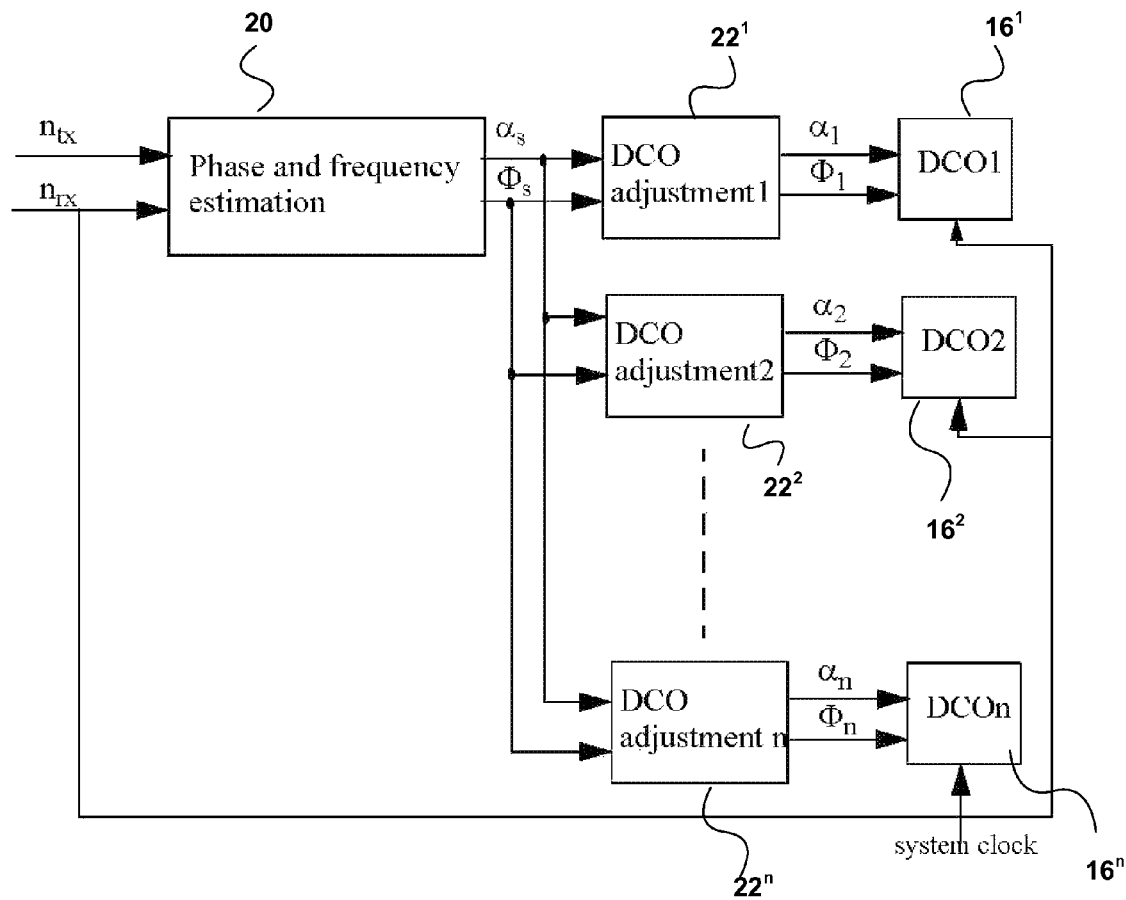
FIG. 6 shows the DCO adjustment system for multiple DCOs.

Another embodiment shown in FIG. 6 has multiple output clocks with multiple DCOs $16^1 \ldots 16^n$. In this case the phase estimation block is coupled to respective adjustment blocks $22^1 \ldots 22^n$ coupled to the DCOs.

As all the DCOs run under the same system clock, there is no need to synchronize them one by one with a phase lock loop. By simply scaling $\alpha_s$ and $\Phi_s$ with different scaling values, it is possible to simultaneously synchronize multiple DCOs as shown in FIG. 6.

Even if the DCOs are running with different system clocks, but if all of them are driven by the same crystal source, the synchronization can be still achieved with the scaling adjustment.

It will thus be seen that embodiments of the invention provide a feedforward ToP architecture with system timing as the local time stamp. The embodiments can be implemented at low cost, and provide accurate network synchronization with accurate frequency and phase estimation.

Instead of using the Least Squares method of estimation, other suitable methods, such as the Recursive Least Square method could be employed.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

The invention claimed is:

1. A method of performing timing synchronization in an asynchronous packet network, comprising:
   receiving over a packet network remote timestamps representative of a transmitter clock at a transmitter;

generating local timestamps at a receiver representative of the timing of a local oscillator at the receiver;
generating an output clock at the receiver with a digital controlled oscillator;
deriving an adjustment signal from the local and remote timestamps; and
adjusting the digital controlled oscillator in a feedforward configuration in accordance with the derived adjustment signal,
wherein a plurality of digital controlled oscillators are adjusted in a feedforward configuration based on a common estimate of the offset between the transmitter clock and the local oscillator derived from the remote and local timestamps.

2. A method as claimed in claim 1, wherein the adjustment signal adjusts the frequency and phase of the digital controlled oscillator.

3. A method as claimed in 2, wherein the adjustment signal is based on a Least Squares estimate.

4. A method as claimed in claim 3, wherein the adjustment of the digital controlled oscillator is performed in accordance with the equations:

$$\hat{\alpha}_s = \frac{\sum x_k y_k - \frac{1}{N}\sum x_k \sum y_k}{\sum x_k^2 - \frac{1}{N}(\sum x_k)^2}$$

$$\hat{\Phi}_s = \frac{\frac{1}{N}\sum x_k^2 \sum y_k - \frac{1}{N}\sum x_k \sum x_k y_k}{\sum x_k^2 - \frac{1}{N}(\sum x_k)^2}$$

where a $\alpha_x$ is the frequency deviation, $y_k$ is the transit time through the network, $\Phi_x$ is the phase offset, $y_k$ is the transit time through the network, $x_k$ is the transmitter timestamp, and N is the number of data samples.

5. A method as claimed in claim 3, wherein the remote timestamps and the difference between the remote timestamps and the local timestamps are fed into a data accumulation unit which accumulates data over a preset time, and wherein the data accumulation unit includes adders and delay units for generating signals $S_x, S_y, S_{xy}$ and $S_{2x}$, where $S_x = \Sigma(x_k)$ $S_y = \Sigma(y_k)$ $S_{2x} = \Sigma(x_k^2)$ $S_{xy} = \Sigma(x_k y_k)$ where $y_k$ is the transit time through the network, and $x_k$ is the transmitter timestamp.

6. A method as claimed in claim 5, wherein the signals $S_x$, $S_y$, $S_{xy}$, and $S_{2x}$ are input to a DCO adjustment unit, which generates the signals $$\alpha_s = \frac{(S_{xy} - S_x S_y / N)}{(S_{2x} - S_x^2 / N)}$$

$$\Phi_s = \frac{(S_{2x} S_y - S_x S_{xy})/N}{(S_{2x} - S_x^2 / N)}$$

where $\alpha_s$ is the frequency deviation, and $\Phi_s$ is the phase offset.

7. A method as claimed in claim 4, wherein an update value α for the frequency of the digital controlled oscillator is generated by multiplying frequency deviation $\alpha_s$ by a scaling factor C and an update value Φ for phase of the digital controlled oscillator is generated by multiplying phase offset $\Phi_s$ by the reciprocal of the scaling factor 1/C.

8. A method as claimed in claim 1, wherein separate update values are derived for each digital controlled oscillator from the common estimate.

9. A method as claimed in claim 1, wherein the adjustment signal is based on a recursive least squares estimate.

10. A timing synchronization apparatus for use at a receiver in an asynchronous packet network comprising:
a local oscillator for generating a system clock at the receiver;
a timestamp unit for generating local timestamps representative of the local oscillator timing;
a processor for receiving remote timestamps sent from a transmitter over a packet network representative of the transmitter clock and the local timestamps to generate an adjustment signal based on an estimate of the offset between the local oscillator and the transmitting clock;
a digital controlled oscillator for generating an output clock at the receiver;
an adjustment unit for adjusting the digital controlled oscillator based on the estimate of the offset in a feedforward configuration; and
a plurality of digital controlled oscillators,
wherein said digital controlled oscillators are adjusted in a feedforward configuration based on a common offset estimate between the transmitter clock and the local oscillator derived by said processor from the remote and local timestamps.

11. An apparatus in claim 10, wherein the processor derives frequency and phase offset signals from the remote and local timestamps.

12. An apparatus as claimed in claim 11, wherein the frequency adjustment unit comprises a first multiplier for multiplying the frequency offset signal by a scaling factor C and a second multiplier for multiplying the phase offset signal by the reciprocal of the scaling factor C to produce update values for the digital controlled oscillator.

13. An apparatus as claimed in 10, wherein the adjustment is based on a Least Squares estimate.

14. An apparatus as claimed in claim 13, wherein the processor derives the frequency and phase offsets in accordance with the equations:

$$\hat{\alpha}_s = \frac{\sum x_k y_k - \frac{1}{N}\sum x_k \sum y_k}{\sum x_k^2 - \frac{1}{N}(\sum x_k)^2}$$

$$\hat{\Phi}_s = \frac{\frac{1}{N}\sum x_k^2 \sum y_k - \frac{1}{N}\sum x_k \sum x_k y_k}{\sum x_k^2 - \frac{1}{N}(\sum x_k)^2}$$

where $\alpha_s$ is the frequency deviation, $y_k$ is the transit time through the network, $\Phi_s$ is the phase offset, $y_k$ is the transit time through the network, $x_k$ is the transmitter timestamp, and N is the number of data samples.

15. An apparatus as claimed in claim 13, further comprising data accumulation unit having inputs configured to receive the difference between the remote timestamps and the local timestamps and comprising an internal counter, a plurality of adders and delays units, which are configured to generate the signals $S_x$, $S_y$, $S_{xy}$ and $S_{2x}$ accumulated over a preset time determined by a main counter where $S_x = \Sigma(x_k)$ $S_y = \Sigma(y_k)$ $S_{2x} = \Sigma(x_k^2)$ $S_{xy} = \Sigma(x_k y_k)$ where $y_k$ is the transit time through the network, and $x_k$ is the transmitter timestamp.

16. An apparatus as claimed in claim 15, further comprising an adjustment unit for the digital controlled oscillator configured to generate the signals $$\alpha_s = \frac{(S_{xy} - S_x S_y / N)}{(S_{2x} - S_x^2 / N)}$$

$$\Phi_s = \frac{(S_{2x} S_y - S_x S_{xy})/N}{(S_{2x} - S_x^2 / N)}$$

where $\alpha_s$ is the frequency deviation, and $\Phi_s$ is the phase offset.

17. An apparatus as claimed in claim 10, further comprising a plurality of adjustment units for deriving a separate adjustment signal for each digital controlled oscillator from the common estimate of the offset.

18. An apparatus as claimed in claim 10, wherein the estimate of the offset is based on a recursive least squares estimate.

* * * * *